April 29, 1958 — L. H. THOMAS — 2,832,111
ADJUSTABLE SOIL PIPE JOINT RUNNER
Filed June 24, 1957
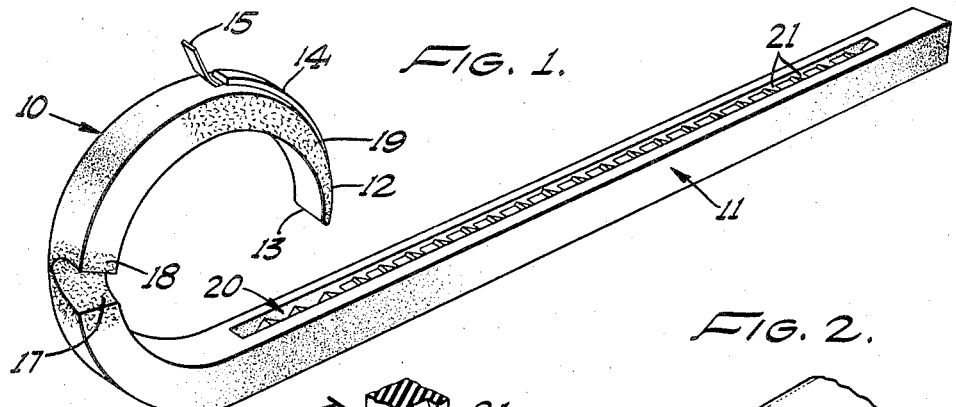
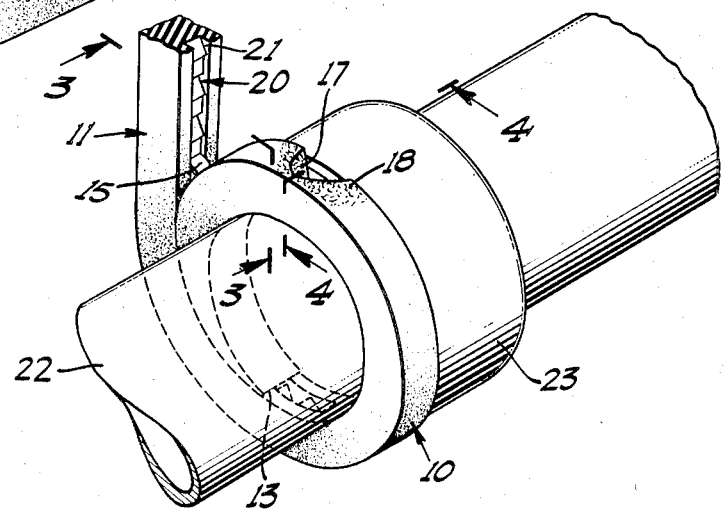
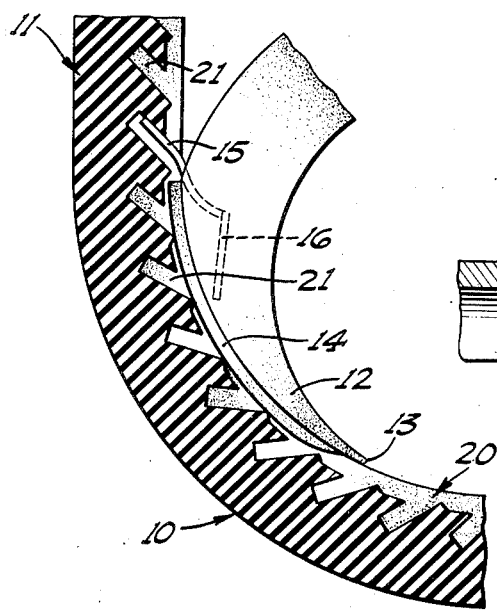
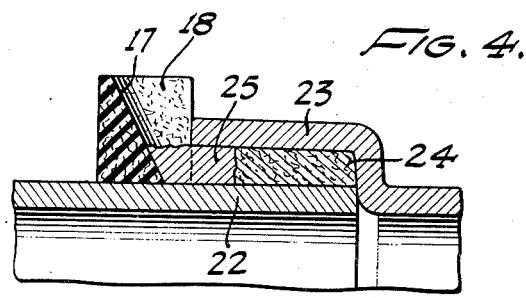
LEON H. THOMAS
INVENTOR.
BY *Hazard & Miller*
ATTORNEYS

United States Patent Office 2,832,111
Patented Apr. 29, 1958

2,832,111

ADJUSTABLE SOIL PIPE JOINT RUNNER

Leon H. Thomas, Canoga Park, Calif., assignor to Perfecto Products Inc., Canoga Park, Calif., a corporation of California Application June 24, 1957, Serial No. 667,650

3 Claims. (Cl. 22—118)

This invention relates to an adjustable soil pipe joint runner.

In assembling sections of soil pipe together the spigot end of one section is inserted in the bell end of an adjoining section and is calked with oakum or similar packing material. It is then desirable to pour in molten lead into the bell around the spigot and against the oakum which will effectively seal the oakum in place. Various devices have heretofore been designed for retaining the molten lead in the bell and enabling it to be poured therein when the pipe joint is in a horizontally disposed position.

An object of the present invention is to provide an improved adjustable soil pipe joint runner of this character which is of relatively simple construction and which can be easily and quickly applied to the joint and removed therefrom.

More specifically, an object of the invention is to provide an adjustable soil pipe joint runner consisting of a section of resilient rubber, arcuately shaped adjacent one end and extending in a tangential direction adjacent the other. The tangentially extending section is adapted to be wrapped around the arcuately shaped section when the latter is in applied position about the spigot end of the soil pipe joint. To maintain the wrapped portions of the runner in mutual alignment a ribbon groove connection is established between the wrapped portions and in order to maintain the runner under tension when in applied position, a simple but highly convenient holding means is provided.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the improved adjustable soil pipe joint runner embodying the present invention;

Fig. 2 is a partial view of the same, showing the runner in applied position on a soil pipe joint;

Fig. 3 is a partial view in vertical section taken substantially upon the line 3—3 upon Fig. 2; and Fig. 4 is a partial view in vertical section taken substantially upon the line 4—4 upon Fig. 2.

Referring to the acompanying drawings wherein similar reference characters designate similar parts throughout, the improved runner is preferably formed of rubber and consists of a section of rubber approximately rectangular in cross-section. One end of this section is arcuately shaped as indicated at 10 and the other end indicated at 11, is arranged approximately tangent with respect thereto. The section 10 is preferably formed of silicone rubber because of the ability of such rubber to resist heat. The section 11 may or may not be formed of silicone rubber as conventional resilient rubber will ordinarily suffice for this section. The extreme end of the arcuately shaped portion 10 is beveled off on its exterior as indicated at 12 so that this end is tapered to a relatively thin edge indicated at 13. On the back or outer side of this end of the arcuately shaped section 10 there is formed a central projecting rib 14 and adjacent the end of this rib there is an outwardly extending metal detent 15, the base of which indicated at 16, is embedded in the section 10.

In one side of the section 10 nearly diametrically opposite the edge 13 there is formed a recess 17 and the walls of this recess and adjacent surfaces preferably have asbestos fibers indicated at 18 embedded therein. Similar asbestos fibers indicated at 19 are embedded in the same side of the tapered end.

The tangentially extending portion 11 has a longitudinally extending groove 20 formed therein which is designed to receive the rib 14. In the back of this groove there are recesses 21, any one of which may receive the projecting end of the detent 15.

In the use of the runner as above described, the arcuately shaped portion 10 is positioned about the spigot 22 of a soil pipe joint after the spigot has been inserted into the bell 23 and has been calked with oakum 24. After the arcuately shaped portion has been positioned about the spigot the tangentially arranged portion 11 is flexed and is brought into wrapping relationship therewith in the manner illustrated in Figs. 2 and 3 wherein the rib 14 has entered the groove 20 to maintain the wrapped portions in mutual alignment. By stretching the portion 11 slightly an adequate tension can be imposed on the runner to maintain it in firm encircling relationship to the spigot 22. The detent 15 can be caused to enter one of the notches 21 causing the runner to maintain itself in applied position about the spigot. When the runner is in applied position it may be tapped in a direction axially of the spigot and against the end of the bell 23. Thereafter, molten lead, indicated at 25, can be poured through the top of the recess 17 and into the bell against the oakum 24. The molten lead is confined in the bell by the runner thus wrapped about the spigot. When the molten lead has solidified the tangentially extending end 11 may be stretched sufficiently to disengage the detent 15 from the notch occupied thereby and the runner can be unwrapped and removed from the pipe.

It will be appreciated that the above-described construction is of very simple design and can be easily manufactured. Furthermore, due to the flexibility as well as the resiliency of the structure the circularly shaped portion 10 can be opened or closed and thus adjusted to fit spigots 22 of various sizes.

Various changes may be made in the details of construction without departing from the spirit and scope of the invention as defined by the appended claims.

I claim:

1. An adjustable soil pipe joint runner comprising a resilient arcuately shaped section adapted to be positioned about the spigot end and against the bell end of a soil pipe joint, there being a recess formed in that side of said section which is adapted to be positioned against the bell end of the soil pipe through which molten metal can be poured into the bell end, one end of said section being tapered and having a central rib projecting from the outer side thereof, the other end of said section being tangentially arranged and being adapted to be flexed and brought into wrapping relation with said arcuately shaped section and having a longitudinally extending groove on its inner side adapted to receive said rib.

2. An adjustable soil pipe joint runner comprising a resilient arcuately shaped section adapted to be positioned about the spigot end and against the bell end of a soil pipe joint, there being a recess formed in that side of said section which is adapted to be positioned against the bell end of the soil pipe through which molten metal can be poured into the bell end, one end of said section being tapered and having a central rib projecting from the outer side thereof, the other end of said section being tangentially arranged and being adapted to be flexed and brought into wrapping relation with said arcuately shaped section and having a longitudinally extending groove on its inner side adapted to receive said rib, and means for holding the tangentially extending end in wrapping relation with the arcuately shaped section.

3. An adjustable soil pipe joint runner comprising a resilient arcuately shaped section adapted to be positioned about the spigot end and against the bell end of a soil pipe joint, there being a recess formed in that side of said section which is adapted to be positioned against the bell end of the soil pipe through which molten metal can be poured into the bell end, one end of said section being tapered and having a central rib projecting from the outer side thereof, the other end of said section being tangentially arranged and being adapted to be flexed and brought into wrapping relation with said arcuately shaped section and having a longitudinally extending groove on its inner side adapted to receive said rib, a detent projecting from the outer side of the arcuately shaped section adjacent the end of said rib and notches in the bottom of the groove on the tangentially extending section in any of which the detent may selectively be received.

References Cited in the file of this patent

UNITED STATES PATENTS

| | | |
|---|---|---|
| 936,627 | Hill | Oct. 12, 1909 |
| 1,414,731 | Englund | May 2, 1922 |
| 1,469,027 | Staunton | Sept. 25, 1923 |
| 1,472,966 | Englund | Nov. 6, 1923 |
| 1,987,920 | Williams | Jan. 15, 1935 |

FOREIGN PATENTS

| | | |
|---|---|---|
| 878,566 | France | Oct. 19, 1942 |